June 20, 1950  A. F. JOHNSON  2,512,157
PURIFICATION OF ALUMINUM
Filed March 20, 1946  4 Sheets-Sheet 2
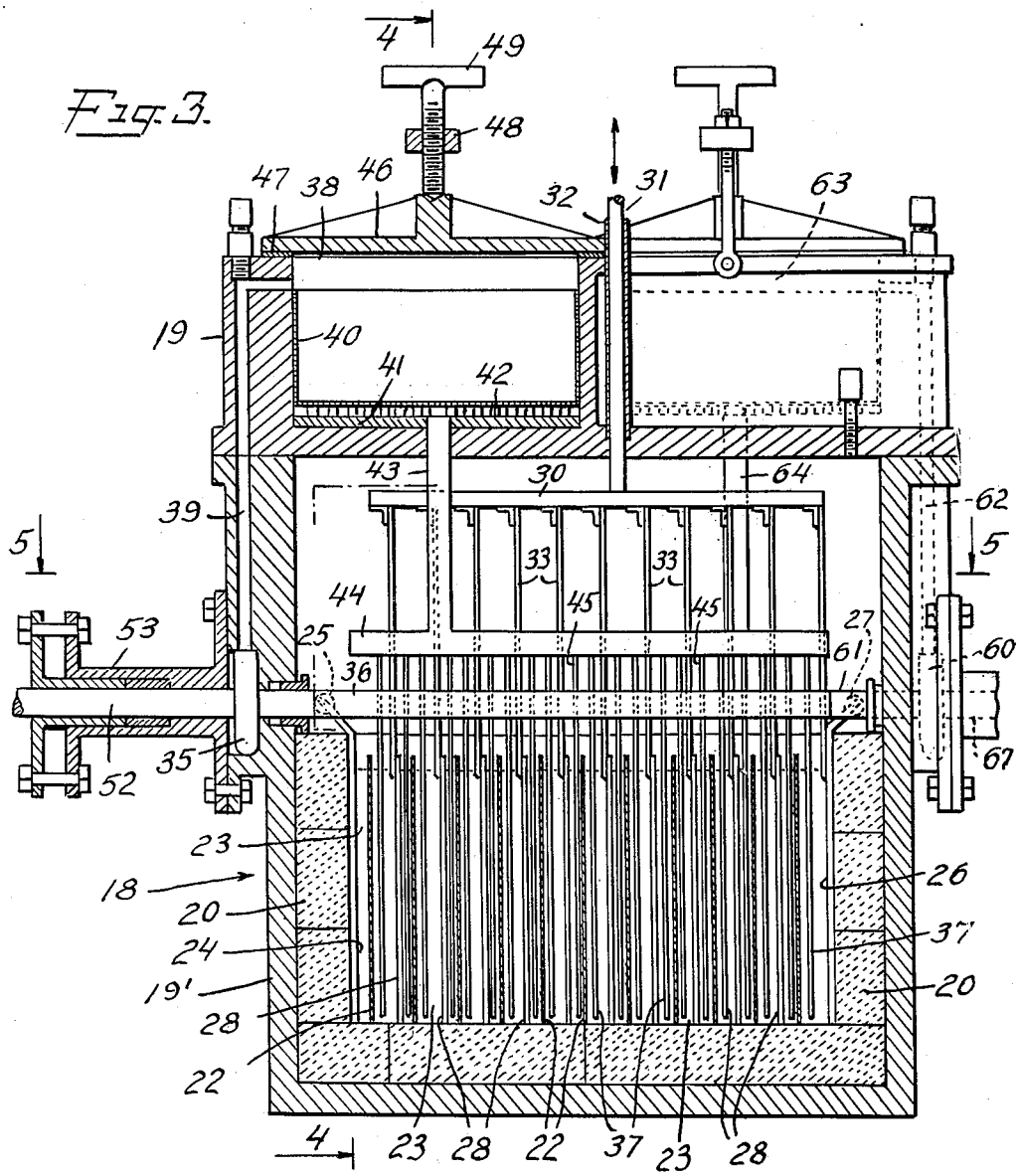
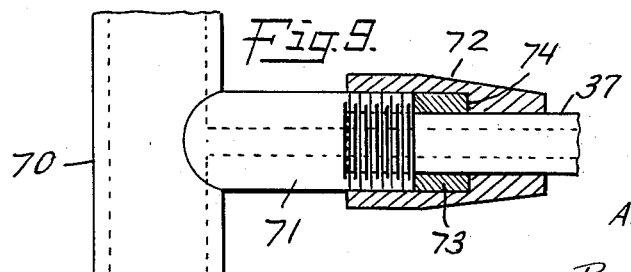
INVENTOR
ARTHUR F. JOHNSON
BY
Pennie, Edmonds, Morton & Barrows
ATTORNEYS

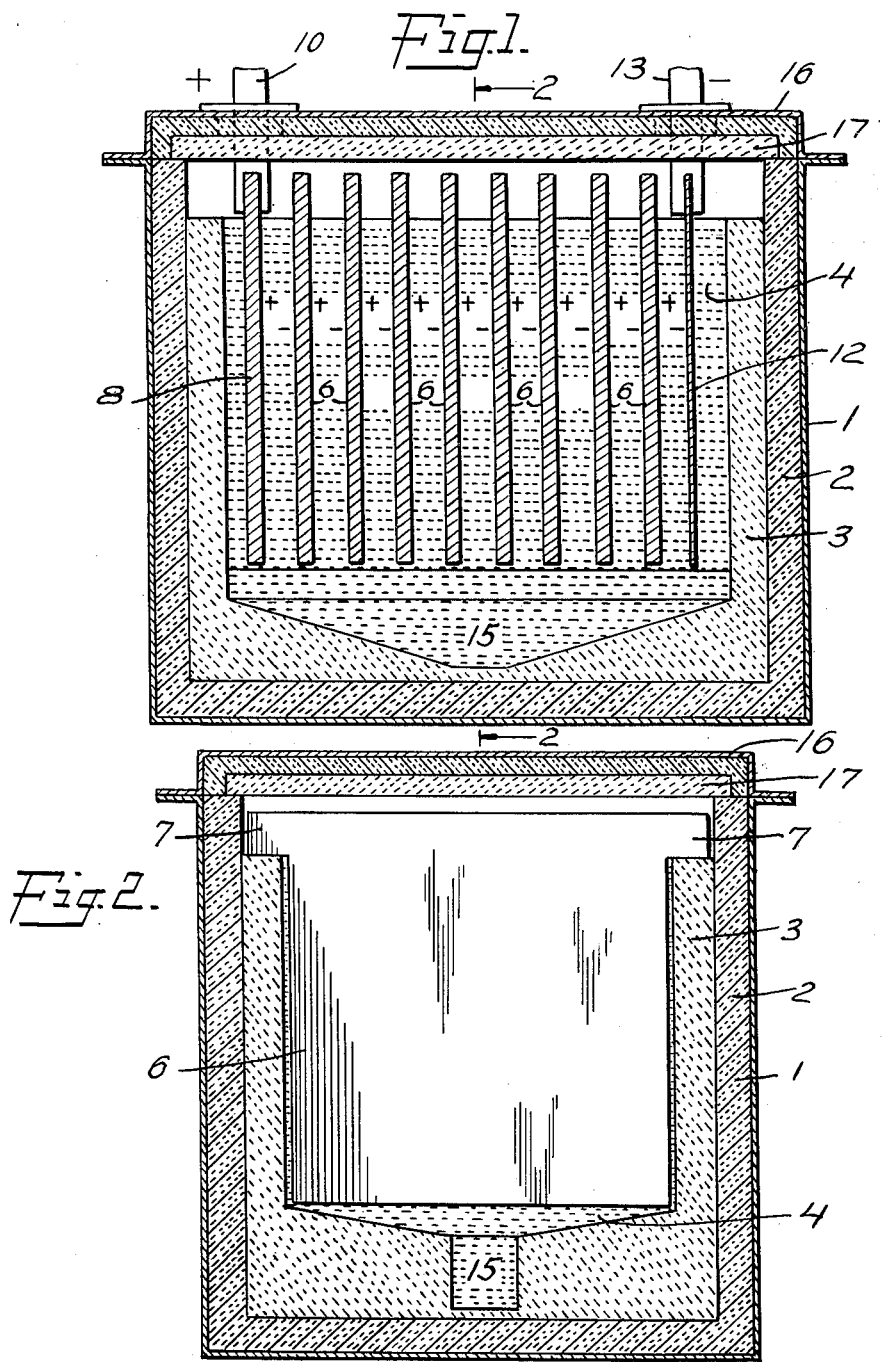

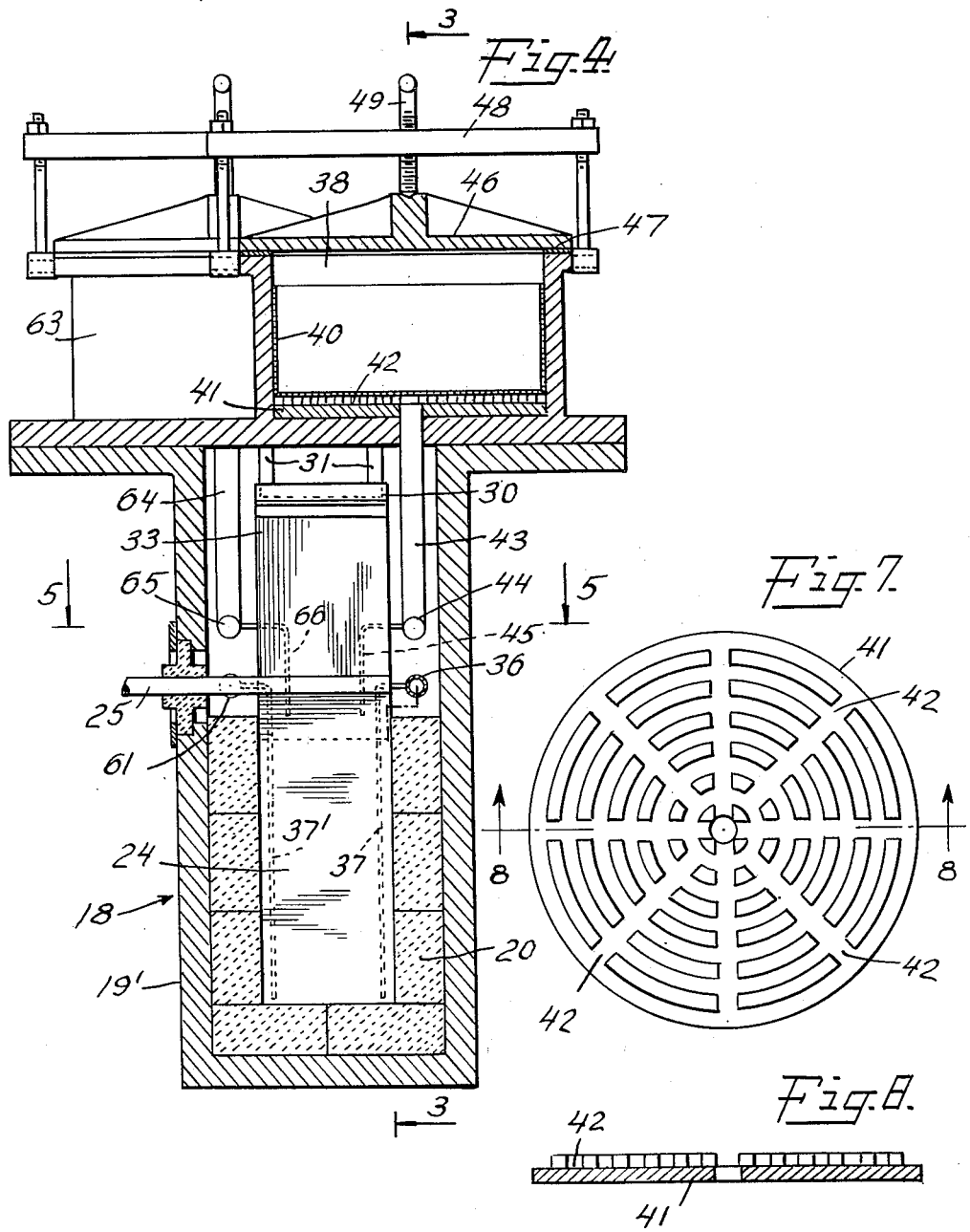

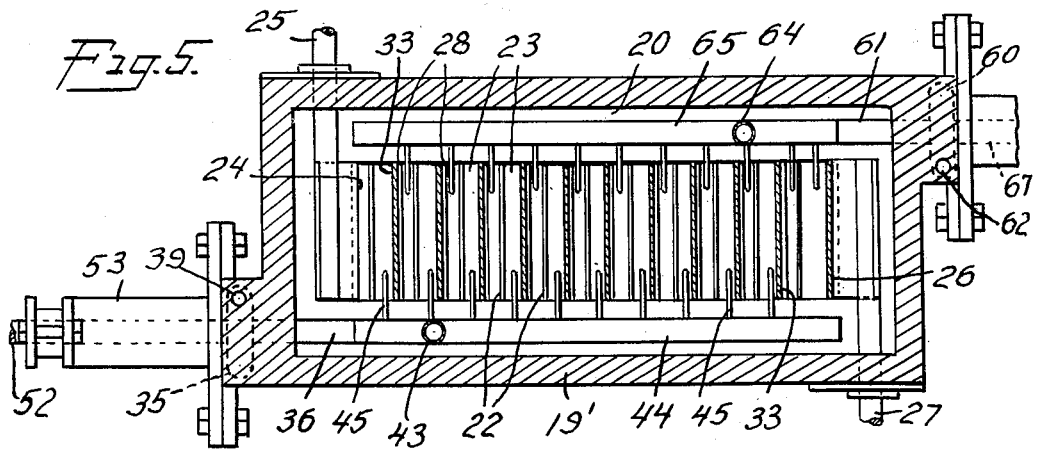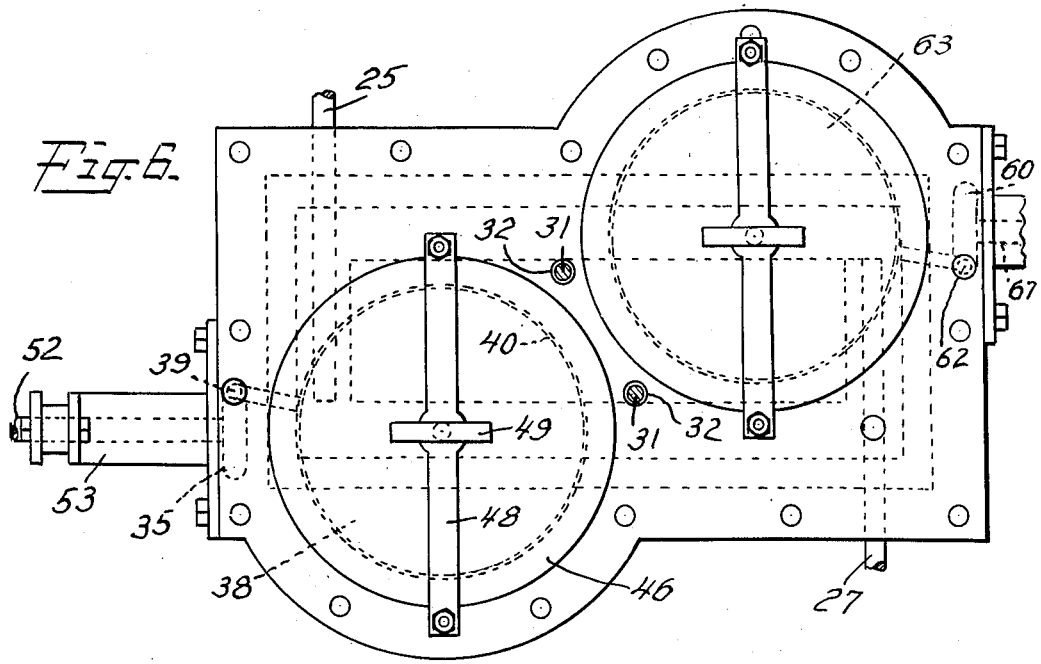

Patented June 20, 1950

2,512,157

UNITED STATES PATENT OFFICE 2,512,157

PURIFICATION OF ALUMINUM

Arthur F. Johnson, Cambridge, Mass., assignor to Reynolds Metals Company, Richmond, Va., a corporation of Delaware Application March 20, 1946, Serial No. 655,775

1 Claim. (Cl. 204—67)

This invention relates to aluminum refining and has for its object the provision of an improved method of separating aluminum from its impurities to produce metallic aluminum of high purity. More particularly the invention provides a method of electrolytically purifying aluminum in a salt fusion which comprises passing a direct electric current from an anode to a cathode through one or more bodies of solid impure aluminum suspended in the fusion to produce pure aluminum electrolytically.

The invention provides a method of flowing an electric current through a salt fusion and through several bodies of impure aluminum in the fusion, each of which acquires an anodic face and a cathodic face, whereby pure aluminum is removed from the anodic face of one aluminum body and deposited on the cathodic face of the adjacent aluminum body. During the electrolysis, the impurities in the aluminum body, such as copper, iron, silicon, zinc, titanium, manganese and nickel, become separated from the aluminum and enter the fusion. I may carry out the operation under conditions resulting in the formation of relatively pure aluminum cathodes in which the aluminum is electrolytically transported through an electrolyte, such as a fusion of aluminum chloride and an alkali metal chloride like sodium chloride, from the impure aluminum bodies to form the pure aluminum cathode. For convenience, I shall refer to the bodies of aluminum as aluminum plates and intermediate electrodes, in view of their preferred flat form and their positions between and in series with, the actual electrodes, and their dual anodic and cathodic characters.

My invention also provides an improved apparatus for the electrolytic refining of aluminum comprising a vessel for a salt fusion and means for suspending intermediate aluminum electrodes undergoing electrolysis out of electrical contact with the vessel. In one of its advantageous embodiments, the invention provides a cell having a vessel for the salt fusion which is sufficiently non-conducting at the voltages used that the electric current flows preferentially through a series circuit in the fusion from anode to cathode and the suspended intermediate aluminum electrodes undergoing refining without any appreciable leakage into the vessel. I have found that a vessel lined with vitreous fused alumina or red shale bricks is satisfactory for the purposes of the invention. One feature of the invention is that I may use very large cells, say, from 5 to 20 feet wide and from 10 to 100 feet long, of considerable depth, in which a large number of the intermediate electrodes are treated in the molten chloride fusion. In the fusion I suspend a series of impure aluminum intermediate electrodes spaced from a fraction of an inch to several inches apart. The electrodes may be cast slabs of impure scrap aluminum and during the course of the refining the aluminum is transported to form pure aluminum cathodes.

In one aspect of my invention, I may recover the aluminum in relatively pure crystal form by scraping the crystals from the cathodes periodically and recovering the crystals from the electrolyte by filtration or other physical separating means.

The aforementioned impurities, or any of them, may be removed from the salt fusion by circulating the fusion through a filter, such as one containing spun-glass cloth, or small pieces of coke. I prefer to use pump means to circulate the fusion through the filter to remove the impurities which are in the form of slimes. In a further embodiment, I provide means for continuously circulating and filtering both the anode and the cathode slimes and keeping them separated by porous diaphragms, such as porous Alundum.

These and other novel features of the invention will be better understood after considering the following discussion taken in conjunction with the accompaying drawings, in which:

Fig. 1 is a sectional side view of an electrolytic cell of the invention;

Fig. 2 is a sectional view along the line 2—2 of Fig. 1;

Fig. 3 is a sectonal side view of another embodiment of the invention, along line 3—3 of Fig. 4;

Fig. 4 is a view along line 4—4 of Fig. 3;

Fig. 5 is a view along line 5—5 of Figs. 3 and 4;

Fig. 6 is a plan view of the cell of Fig. 3;

Fig. 7 is a plan view of the filter grid;

Fig. 8 is a view along line 8—8 of Fig. 7; and

Fig. 9 is an enlarged view of a filter pipe used in the cell of Fig. 3.

The rather simple cell, illustrated somewhat diagrammatically in Figs. 1 and 2, comprises a steel shell 1, a heat insulating refractory 2, such as rammed alumina, and an electrically non-conducting lining 3, such as vitreous alumina, forming a vessel for the fusion 4, which is preferably a mixture of aluminum chloride and potassium chloride. Suspended within the fusion are several intermediate electrodes in the form of slabs 6 formed of cast crude or scrap aluminum. These slabs have projecting ears 7 by means of which they are supported upon the upper edges of the non-conducting pot lining and held out of direct electrical contact with each other. The slab 8 is connected to the positive terminal 10 of a source of direct current and, accordingly, is the anode of the cell. The starting sheet 12 of pure aluminum is connected to the negative side of the circuit 13 and is accordingly the cathode of the cell. The intermediate electrodes 6 have a dual character in that each has an anodic face and a cathodic face, the electric current flowing through the salt fusion from the anode to the cathode in series through each of the intermediate electrodes.

In order to facilitate removal of the slimes which form on the intermediate electrodes from the impurities and settle to the cell bottom, I slope the bottom towards the center where I provide a collecting sump 15. I may pump out the sump from time to time and filter out the impurities from the fusion.

In order to protect the salt fusion from moisture, especially moist air, the top is closed with a removable cover comprising a steel plate 16 and a refractory lining 17. At this time generating systems are available for the aluminum industry which provide 55,000 amperes at 500 volts and such electricity could be employed to operate one or more cells of the invention. The cells may be operated at a voltage of around 2 volts from electrode to electrode at a current density of around 2 amperes per square inch. A cell, such as that of Figs. 1 and 2, would operate at an overall voltage of about 20 volts and several of these, say 25, would be required on a 500 volt power supply. One large cell with, say, 250 intermediate electrodes, or suitable subdivisions of such cells, all in series, may be used.

In carrying out a process of the invention, the vessel is filled with a suitable salt mixture, preferably a mixture of aluminum chloride and an alkali metal halide, for example 55 parts of aluminum chloride and 45 parts of potassium chloride. Using a voltage of about 2 volts between electrodes, pure aluminum is removed electrolytically from the anode 8 and from the anodic face of each of the intermediate electrodes and is deposited on the cathode 12 and on the cathodic face of each intermediate electrode. As the operation proceeds, the impure slabs of aluminum disappear as such and are reformed as a cathode of high purity aluminum. During the operation, the metallic impurities are left in the fusion and become associated with anode and cathode slimes which settle to the bottom of the bath and collect in the sump 15 from which they may be removed periodically, such as by dredging with a pump. In one aspect of my invention, I may facilitate the removal and recovery of the slimes and thereby prevent contamination of the deposited aluminum by circulating the fusion through a filter formed of spun glass or powdered coke.

In order to save heat, the refining cell may be constructed largely in the earth below the floor level and the upper surface may be protected with a readily removable arched refractory cover.

The apparatus illustrated in Figs. 3 to 9 comprises a metal shell 18 in two major parts, an upper part 19 removably attached to a lower part 19' which is lined with electrically non-conducting refractory 20, such as fused vitreous alumina or red shale bricks extending upwardly only a sufficient distance to retain the salt fusion. Inside the receptacle or vessel provided by the refractory, several partitions or porous diaphragms 22 are inserted to divide the vessel into individual cells 23, hereinafter called "sub-cells". These partitions or porous walls are preferably formed of porous Alundum which is impervious to the passage of the fused salt but is pervious to the passage of aluminum ions. In the first sub-cell at the left as viewed in Fig. 3 the true anode 24 is located and is connected to the power line by the conductor 25. In the last sub-cell, on the right of Fig. 3, a sheet of pure aluminum 26 is located and used as the true cathode. It is connected to the negative side of the power line 27. In each of the other sub-cells, a flat sheet of impure aluminum 28 is supported in an upright position and out of direct electrical contact with the power circuit.

The electric current flowing from the anode 24 to the cathode 26 flows in series through the fusion, the porous walls 22 and the aluminum sheets 28 which become intermediate electrodes in the circuit. Each aluminum sheet is formed of impure aluminum to be purified, and during the electrolytic operation, aluminum from the anodic face of one sheet is transferred through the adjacent porous wall to the cathodic face of the aluminum sheet in the adjacent sub-cell. The aluminum is deposited in the form of crystals. In the form of invention illustrated in Figs. 3 to 9, I remove these crystals periodically and recover them by means now to be described.

The header bar 30 is supported on and moved up and down by the shaft 31 which slides in the bearing 32. Any suitable mechanism for imparting a reciprocating motion to the shaft 31 to give it a stroke equal to the length of the intermediate electrodes 28 may be used. Supported on the under side of the header 30 is a series of upright scrapers 33, each having a chisel-like edge and being arranged to move up and down against the cathodic surfaces of the intermediate electrodes and scrape off the deposited aluminum crystals. These crystals settle, along with a certain amount of cathodic slime, into the bottoms of the sub-cells in the spaces between the porous walls and the cathodic faces of the intermediate electrodes. On the opposite side of the intermediate electrode, which is the anodic face, the metallic impurities released from the impure aluminum, together with other material of a slimy nature, settle into the space between the cathodic face and the porous wall.

In order to recover the aluminum crystals and remove the contaminating cathodic slime, I provide the suction pump 35 and manifold 36 with glass tubes 37 connected thereto. Each of these glass tubes is, accordingly, electrically insulated from the manifold (Fig. 9) and dips into the fusion in the bottom of each sub-cell in the space between a porous wall and a cathodic face. The crystals and cathodic slimes are sucked out and pumped upwardly through the duct 39 and discharged into the filter well 38. Inside the filter well, a perforated metal basket 40 is supported upon the lattice grid 41 which has several radial channels 42 leading towards the center (Fig. 7). The basket may also be lined with closely woven glass cloth. The filtered salt fusion passing through the basket flows through the radial channels into the upright pipe 43 and then into the horizontal manifold 44. This manifold has several upright delivery tubes 45 (Fig. 4) for returning the filtered salt fusion to the sub-cells. The delivery tubes may be of glass as shown in Fig. 9. The filter well 38 has a metal cover 46 which is held tight against the asbestos packing 47 by the bar 48 and screw 49.

Periodically the basket 40 may be removed to recover the crystals of pure aluminum. By any suitable washing means, the slime may be removed from the crystals. The pump 35 may be a rotary, centrifugal or gear pump and the drive shaft 52 has a stuffing box 53 to prevent the infiltration or passage of gases along the shaft.

In order to remove the metallic impurities contained in the scrap aluminum, which are associated with the anodic slimes accumulated in the spaces between the anodic faces of the intermediate electrodes and the adjacent porous wall, the pump unit comprising the pump 60, the manifold 61, glass tubes 37' and an upright duct 62 are provided. The several glass tubes 37' are connected to the manifold 61 as shown in Fig. 9, each of which projects into the bottom of the space between the anodic face and the adjacent porous wall (Fig. 4). The pump sucks out the metallic impurities and slime and delivers them through the duct 62 into the filter well 63. This filter well is constructed similar to the filter well 38 and has a central duct 64 by means of which the filtered salt fusion is returned to the horizontal manifold 65 which has several delivery tubes 66, preferably in the form of small glass tubes as in Fig. 9, each of which delivers a part of the salt fusion to one of the sub-cells.

The pump 60 is similar to the pump 35 and is also provided with stuffing box means to prevent the passage of gas along the shaft 67.

Fig. 9 shows a manifold pipe 70 which is similar to the manifolds 36, 44, 61 and 65 and may be formed of aluminum or other metal to which is attached a laterally disposed pipe 71 of similar metal. The threaded end of pipe 71 has a threaded sleeve 72 attached thereto. The glass pipe 37 is inserted through the hollow end of the sleeve and into the pipe 71. By means of the asbestos packing 73 and the shoulders 74, the pipe 37 is held in tight contact with pipe 71. It is understood, of course, that each of the pipes connected to the manifolds 36, 44, 61 and 65 is similar and may be used in the sub-cells without danger of short circuiting the intermediate electrodes.

In carrying out a method of the invention in the form of apparatus illustrated in Figs. 3 to 9, a salt fusion containing, say, 55% of aluminum chloride and 45% of potassium chloride, is placed inside the refractory lined receptacle which is divided into several sub-cells by the porous Alundum walls 22. The impure aluminum slabs or sheets are placed in position, as shown, the top portion of the cell 19 is tightly bolted in place, and a sufficient voltage is impressed between the anode 25 and the cathode 26 to give approximately 2 volts between the adjacent intermediate electrodes. A current density of about 2 amperes per square inch may be used. As the operation proceeds with the current flowing in series from intermediate electrode to intermediate electrode, the aluminum is removed from one intermediate electrode, passed through the porous wall and deposited as crystals of pure aluminum on the cathodic face of the adjacent intermediate electrode. As the shaft 31 with the header 30 moves up and down, the crystals are scraped off and they sink through the salt fusion to the bottom. The pump 35 may run continuously, if desired, and sucks some of the salt fusions with the cathodic slimes and crystals of aluminum off the bottom of the sub-cells and deposits it in the basket 40. The glass filter cloth and porous basket remove the crystals and slime from the fusion which is returned through ducts 43, 44 and 45 to the sub-cells. When the basket is filled, the cover 46 is removed to permit removal of the basket. The slimes may be washed from the crystals to recover pure aluminum.

During the course of the operation, the metallic impurities and anodic slimes are accumulated in the lower portions of the sub-cells between the anodic faces of the intermediate electrodes and the adjacent porous wall. These impurities and slimes are sucked by pump 60 off the bottom through pipes 37' into the manifold 61 and are forced upward through the duct 62 and discharged into a filter basket (not shown) in the filter well 63. The impurities and slimes are retained in the basket and the cleaned salt fusion is returned through ducts 64, 65 and 66 to the sub-cells.

After the aluminum plates 28 are reduced to such thinness that they might be broken or separated on continued electrolysis, the upper portion 19 of the cell is uncoupled and lifted off, and what remains of the intermediate electrodes is removed. Fresh plates or slabs of the impure aluminum to be refined are placed in the sub-cells in upright positions between the refractory side walls 20 and after returning the upper portion 19, the operation is resumed.

I claim:

The method of purifying aluminum by electrolysis which comprises passing an electric current through an inorganic salt fusion consisting of aluminum chloride and an alkali metal chloride from an anode to a cathode, suspending in the fusion in the path of current flow a plurality of plates of impure aluminum, each plate having an anodic face from which aluminum is removed and a cathodic face on which aluminum crystals are deposited, scraping the deposited crystals of aluminum from the cathodic faces and settling them in the fusion, pumping the fusion from the lower portion of the cell with its contained crystals into a filter, and recovering the crystals as purified aluminum.

ARTHUR F. JOHNSON.

REFERENCES CITED

The following references are of record in the file of this patent:

UNITED STATES PATENTS

| Number | Name | Date |
|---|---|---|
| 322,169 | Farmer | July 14, 1885 |
| 673,364 | Hoopes | Apr. 10, 1901 |
| 922,079 | Blackmore | May 18, 1909 |
| 1,545,383 | Ashcroft | July 7, 1925 |
| 1,545,384 | Ashcroft | July 7, 1925 |
| 1,833,806 | Brode et al. | Nov. 24, 1931 |
| 1,854,684 | Weber et al. | Apr. 19, 1932 |
| 1,942,208 | Gamichon | Jan. 2, 1934 |
| 2,231,030 | Scofield et al. | Feb. 11, 1941 |

FOREIGN PATENTS

| Number | Country | Date |
|---|---|---|
| 312,598 | Great Britain | May 27, 1929 |